(12) United States Patent
Feldman et al.

(10) Patent No.: US 7,610,928 B2
(45) Date of Patent: Nov. 3, 2009

(54) VALVE AND ACTUATOR ASSEMBLIES

(75) Inventors: Joel Feldman, Solon, OH (US); Peter Sulcs, Chagrin Falls, OH (US); Daniel E. Zeiler, Mentor, OH (US); Charles W. Hayes, II, Wickliffe, OH (US); David Hasak, Concord, OH (US); Yancy J. Waller, Painesville, OH (US)

(73) Assignee: Swagelok Company, Solon, OH (US)

( * ) Notice: Subject to any disclaimer, the term of this patent is extended or adjusted under 35 U.S.C. 154(b) by 614 days.

(21) Appl. No.: 11/359,062

(22) Filed: Feb. 22, 2006

(65) Prior Publication Data

US 2006/0196558 A1 Sep. 7, 2006

Related U.S. Application Data

(60) Provisional application No. 60/654,917, filed on Feb. 22, 2005.

(51) Int. Cl.
*F16K 24/04* (2006.01)
(52) U.S. Cl. .................. 137/1; 137/596; 251/318; 251/321
(58) Field of Classification Search .......... 137/625.2, 137/625.25, 625.26, 1, 589, 596; 251/318–321
See application file for complete search history.

(56) References Cited

U.S. PATENT DOCUMENTS

| | | | |
|---|---|---|---|
| 1,926,925 A | 9/1933 | Wescott | |
| 2,473,465 A | 6/1949 | Betz | |
| 2,625,174 A * | 1/1953 | Forde | 137/491 |
| 2,913,005 A * | 11/1959 | Grant et. al. | 137/625.6 |
| 2,988,279 A | 6/1961 | Irwin | |
| 3,016,917 A | 1/1962 | Hunt | |
| 3,111,139 A | 11/1963 | Beckett et al. | |
| 3,158,164 A | 11/1964 | Barton | |
| 3,215,158 A | 11/1965 | Bass Jr. et al. | |
| 3,263,253 A | 8/1966 | Wollard et al. | |
| 3,314,448 A | 4/1967 | Wolff et al. | |
| 3,335,756 A | 8/1967 | McPherson | |
| 3,509,904 A | 5/1970 | Olson | |
| 3,509,913 A | 5/1970 | Lewis | |

(Continued)

FOREIGN PATENT DOCUMENTS

FR 1325312 3/1963

(Continued)

OTHER PUBLICATIONS

Partial International Search Report from PCT/US06/006364.

(Continued)

*Primary Examiner*—Kevin L Lee
(74) *Attorney, Agent, or Firm*—Calfee, Halter & Griswold LLP

(57) ABSTRACT

The present application relates to valve and actuator assemblies. The valve actuator assemblies may include a capless valve actuating arrangement, include a replaceable passage defining member that includes seal members, include a valve member that is assembled in a valve chamber from an end of the valve body that is opposite an end that a piston is assembled in, and/or include a valve member that may be rotated in a valve body without affecting the ability of the valve member to perform its sealing functions.

20 Claims, 11 Drawing Sheets

U.S. PATENT DOCUMENTS

| | | | |
|---|---|---|---|
| 3,563,131 A | 2/1971 | Ridley, Sr. | |
| 3,654,960 A | 4/1972 | Kiernan | |
| 3,731,905 A | 5/1973 | Piet | |
| 3,736,960 A * | 6/1973 | Cohen | 137/625.6 |
| 4,011,888 A | 3/1977 | Whelchel et al. | |
| 4,224,957 A | 9/1980 | Darves et al. | |
| 4,271,970 A | 6/1981 | Miller et al. | |
| 4,334,785 A | 6/1982 | Blach | |
| 4,414,882 A | 11/1983 | Frei | |
| 4,450,861 A | 5/1984 | Bouteille | |
| 4,570,674 A | 2/1986 | Kaye | |
| 4,586,531 A | 5/1986 | Lindell | |
| 4,615,353 A | 10/1986 | McKee | |
| 4,687,017 A | 8/1987 | Danko et al. | |
| 4,757,943 A | 7/1988 | Sperling et al. | |
| 4,846,212 A | 7/1989 | Scobie et al. | |
| 4,848,405 A | 7/1989 | Albrecht | |
| 4,915,134 A | 4/1990 | Toliusis et al. | |
| 4,934,411 A | 6/1990 | Albrecht | |
| 4,951,918 A * | 8/1990 | Wells et al. | 251/321 |
| 5,000,212 A | 3/1991 | Tervo | |
| 5,020,570 A | 6/1991 | Cotter | |
| 5,170,659 A | 12/1992 | Kemp | |
| 5,305,788 A | 4/1994 | Mayeaux | |
| 5,361,805 A | 11/1994 | Mayeaux | |
| 5,558,129 A | 9/1996 | Mayeaux | |
| 5,561,956 A | 10/1996 | Englekirk et al. | |
| 5,697,746 A | 12/1997 | Brown et al. | |
| 5,927,337 A | 7/1999 | LaMantia | |
| 6,152,175 A | 11/2000 | Itoh et al. | |
| 6,619,321 B2 | 9/2003 | Reid, II et al. | |
| 2003/0183789 A1 | 10/2003 | Kerg et al. | |
| 2004/0094740 A1 | 5/2004 | Itoi | |
| 2004/0168732 A1 | 9/2004 | Perusek et al. | |
| 2005/0252555 A1 | 11/2005 | Browne et al. | |

FOREIGN PATENT DOCUMENTS

| | | |
|---|---|---|
| GB | 2 303 199 | 2/1997 |
| GB | 2310479 | 8/1997 |
| SU | 720215 | 3/1980 |
| WO | WO 2004/072520 | 8/2004 |

OTHER PUBLICATIONS

IGC II Integrated Gas Components brochure, 12 pgs. Swagelok Company, copyright 2001, 2003, printed USA.
Parker R-max Stream Switching System brochure, 12 pgs., Parker Instrumentation, Parker Catalog 4140-R, revised, Jun. 2002.

* cited by examiner

VALVE AND ACTUATOR ASSEMBLIES

RELATED APPLICATIONS

The present application claims priority to prior International Application Ser. No. PCT/US2006/006364, filed Feb. 22, 2006 for VALVE AND ACTUATOR ASSEMBLIES, which claims priority from provisional application Ser. No. 60/654,917, entitled "Valve Assemblies," filed on Feb. 22, 2005. Provisional application Ser. No. 60/654,917 and International Application Ser. No. PCT/US2006/006364 are incorporated herein by reference in their entirety.

FIELD OF THE INVENTION

The present invention relates to valve and actuator assemblies.

BACKGROUND OF THE INVENTION

Valves that block an inlet passage, block an outlet passage and open a vent passage when in a first state and open an inlet passage, open an outlet passage and block a vent passage when in a second state are sometimes referred to as double block and bleed valves. One application of double block and bleed valves is to select one of a plurality of sample streams that is routed to a process analyzer.

It is common practice to utilize a single automated process analyzer for analyzing multiple sample streams. This significantly reduces the cost of analyzing gas and liquid process streams in petrochemical plants, refineries and other process-related industries. The sample streams are generally transported to an automated valving manifold near an analyzer by tubing or piping. The automated valving manifold is usually electronically controlled to sequentially select and divert individual sample streams to the automated analyzer.

Air actuators are used to operate valves, such as double block and bleed valves. Typical air actuators include an actuator housing that defines a cylinder, a piston disposed in the cylinder, and a cap that closes the piston in the cylinder and limits axial movement of the piston in the cylinder. Air is selectively provided into the cylinder to move the piston against a biasing force of a spring. Some air actuators include a visual indicator that is screwed onto the cap to indicate the position of the piston. One such visual indicator includes a plunger that is in contact with the piston. Movement of the piston moves the plunger to indicate the position of the piston. The height of the visual indicator is typically set for each individual valve.

SUMMARY

One aspect of the present application is a capless valve actuating arrangement. A capless valve actuating arrangement allows a position of a piston to be visually inspected. Another aspect of the present application is a valve that allows seal members that facilitate opening and closing of a valve to be easily replaced. One such valve, which may be a double block and bleed valve, includes a replaceable passage defining member that includes seal members. The seal members can easily be replaced by replacing the passage defining member. Another aspect of the present application relates to an actuator construction that eliminates the need for a cap over the piston. For example, a valve, which may be a double block and bleed valve, may include a two or more part valve body that allows a valve member to be assembled in a valve chamber from an end of the valve body that is opposite an end that a piston is assembled in. The piston and the valve member may be connected together to eliminate the need for a cap. Another aspect of the present application relates to a valve that includes first and second co-planar ports that are sealed by a valve member regardless of a rotational position of the valve member. One such valve includes a valve member that can be rotated about an axis and perform double block and bleed seal functions, regardless of the rotational position of the valve member. For example, the valve member may include a flat surface that seals against co-planar ports regardless of the rotational orientation of the valve member. These various aspects may be realized in many alternative embodiments, either individually or in various combinations and subcombinations thereof. Unless expressly excluded herein all such combinations and subcombinations are intended to be within the scope of the present invention.

An example of one valve assembly includes a valve body, a valve member, and a passage defining member. The valve body defines a valve chamber. The valve member is disposed in the valve chamber. The passage defining member defines an inlet passage, an outlet passage, and a vent passage. When the valve member is at the first position, flow between the inlet passage and the valve chamber is blocked, flow between the outlet passage and the valve chamber is blocked, and flow between the vent passage and the valve chamber is open. When the valve member is at the second position, flow between the inlet passage and the valve chamber is open, flow between the outlet passage and the valve chamber is open, and flow between the vent passage and the valve chamber is blocked.

In one embodiment, the passage defining member defines a wall of the valve chamber. In this embodiment, the valve member can be placed in the valve chamber from an end of the valve body that the passage defining member is secured to. In another embodiment, all of the walls of the valve chamber are defined by the valve body.

The inlet passage, the outlet passage, and the vent passage may be opened or blocked in a variety of different ways. In one embodiment, the valve includes an inlet seal that is fixed with respect to the inlet passage and an outlet seal that is fixed with respect to the outlet passage. In this embodiment, the valve member engages the inlet seal and the outlet seal when the valve member is in the first position. The valve member may comprise an annular disk that engages both the inlet seal and the outlet seal. Such an annular disk would selectively open and block the valve passages regardless of a rotational position of the valve member relative to the valve chamber.

In one embodiment, the vent port is centrally located with respect to the valve body. For example, an axis of the vent port may be aligned with an axis of the valve member and/or may be aligned with an axis of the valve chamber.

The valve member may carry one or more sealing structures. For example, the valve may include an elongated inlet sealing structure extending from the valve member and an elongated outlet sealing structure extending from the valve member. In one embodiment, the elongated inlet sealing structure engages the passage defining member to seal the inlet passage and the elongated outlet sealing structure engages the passage defining member to seal the outlet passage when the valve member is in the first position. In another embodiment, the elongated inlet sealing structure engages a valve body outer surface to seal the inlet passage and the elongated outlet sealing structure engages the valve body outer surface to seal the outlet passage when the valve member is in the first position.

The vent passage may be selectively opened and blocked in a variety of different ways. For example, a vent sealing member may be disposed around a valve member shaft. The vent sealing member provides a seal between the valve member and the valve body when the valve member is in one position to block flow between the valve chamber and the vent passage. In another exemplary embodiment, an elongated vent sealing structure extends from the valve member. The elongated vent sealing structure may engage a valve body inner surface to seal the vent passage when the valve member is in the second position.

A capless valve activator can take a wide variety of different forms. An example of one such capless valve actuator assembly includes a valve body, a piston, and a valve member. The valve body defines a piston recess in a first end of the valve body and a valve member recess in a second end of the valve body. The piston is disposed in the piston recess. The valve member is disposed in the valve member recess such that axial movement of the valve member is limited by the valve body. The valve member is coupled to the piston such that axial movement of the piston causes axial movement of the valve member. The axial movement of the piston in the piston recess is limited by the valve member. In one embodiment, the valve body includes a passage that extends between the piston recess and the valve member recess. In this embodiment, the piston is coupled to the valve member by a shaft disposed in the passage.

In one embodiment, the valve member and piston are moveable between a first position and a second position. The piston may extend past an end of the valve body when the piston and the valve member are in the second position. In one embodiment, a portion of the piston that extends past the first end of the valve body has a finish that differs from a valve body finish to provide a visual indication that the valve member and the piston are in the second position.

In one embodiment, a portion of the piston that extends past the first end of the valve body includes a circumferential step. The step limits exposure of a piston seal to foreign objects.

In one embodiment, the passage defining member may comprise a manifold member that routes fluid to the inlet passage, fluid away from the outlet passage, and fluid away from the vent passage. In one embodiment, the passage defining member may comprise a flange member interposed between a manifold and the valve body.

In one embodiment of a passage defining member with inlet and outlet seal members assembled with the valve flange member, a valve member contacts the inlet seal member and the outlet seal member to block flow. The valve member is moved to a position where the valve member is spaced apart from the inlet seal member and the outlet seal member to allow flow. The passage defining member and the valve body may be discrete pieces. The inlet and outlet seal members may be comprised of o-rings that are staked to the passage defining member. The inlet and outlet seal members may be replaced by removing the passage defining member and replacing the passage defining member with a passage defining member that includes new inlet and outlet seal members. Annular grooves that accept the inlet and outlet seal members may be defined in a face of the passage defining member.

Further advantages and benefits will become apparent to those skilled in the art after considering the following description and appended claims in conjunction with the accompanying drawings.

DETAILED DESCRIPTION

The present application relates to various features of valve and actuator assemblies. These features include, but are not limited to; a capless valve actuating arrangement; a replaceable passage defining member that includes seal members; assembling a valve member in a valve chamber from an end of the valve body that is opposite an end that a piston is assembled in; and a valve member that may be rotated in a valve body without affecting the ability of the valve member to perform its sealing functions. These features are embodied in one or more of the double block and bleed valve assemblies 10 illustrated by FIGS. 1-9. The present invention is not limited to the examples illustrated by FIGS. 1-9. Double block and bleed valves are but one example of the wide variety valve and actuator assemblies that the features disclosed by the present application may be applied to. The features disclosed by the present application may be applied to any actuator controlled valve.

Figure 1:
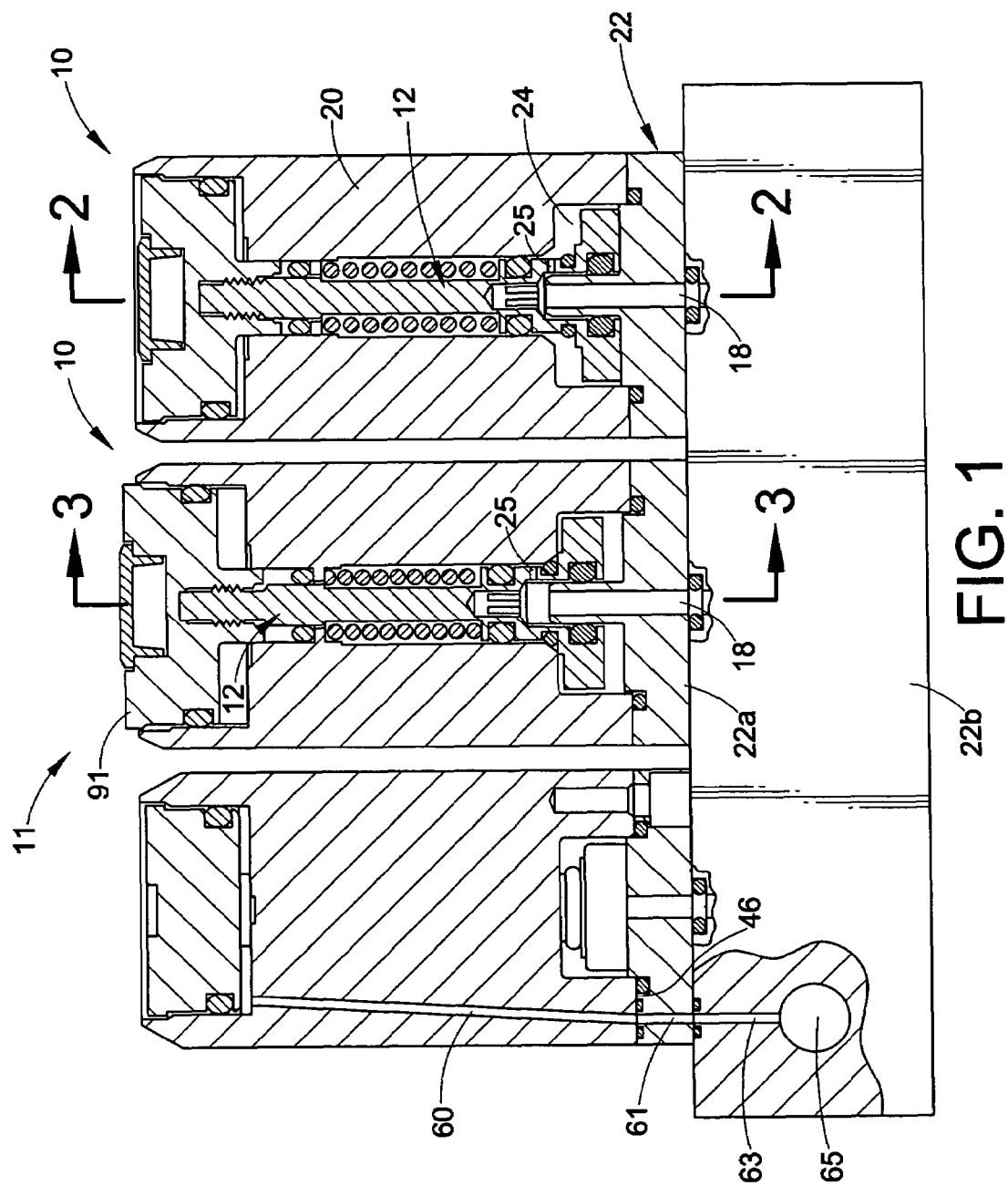
FIG. 1 is a sectional view of a series of double block and bleed valves in a stream select system.
Figure 2:
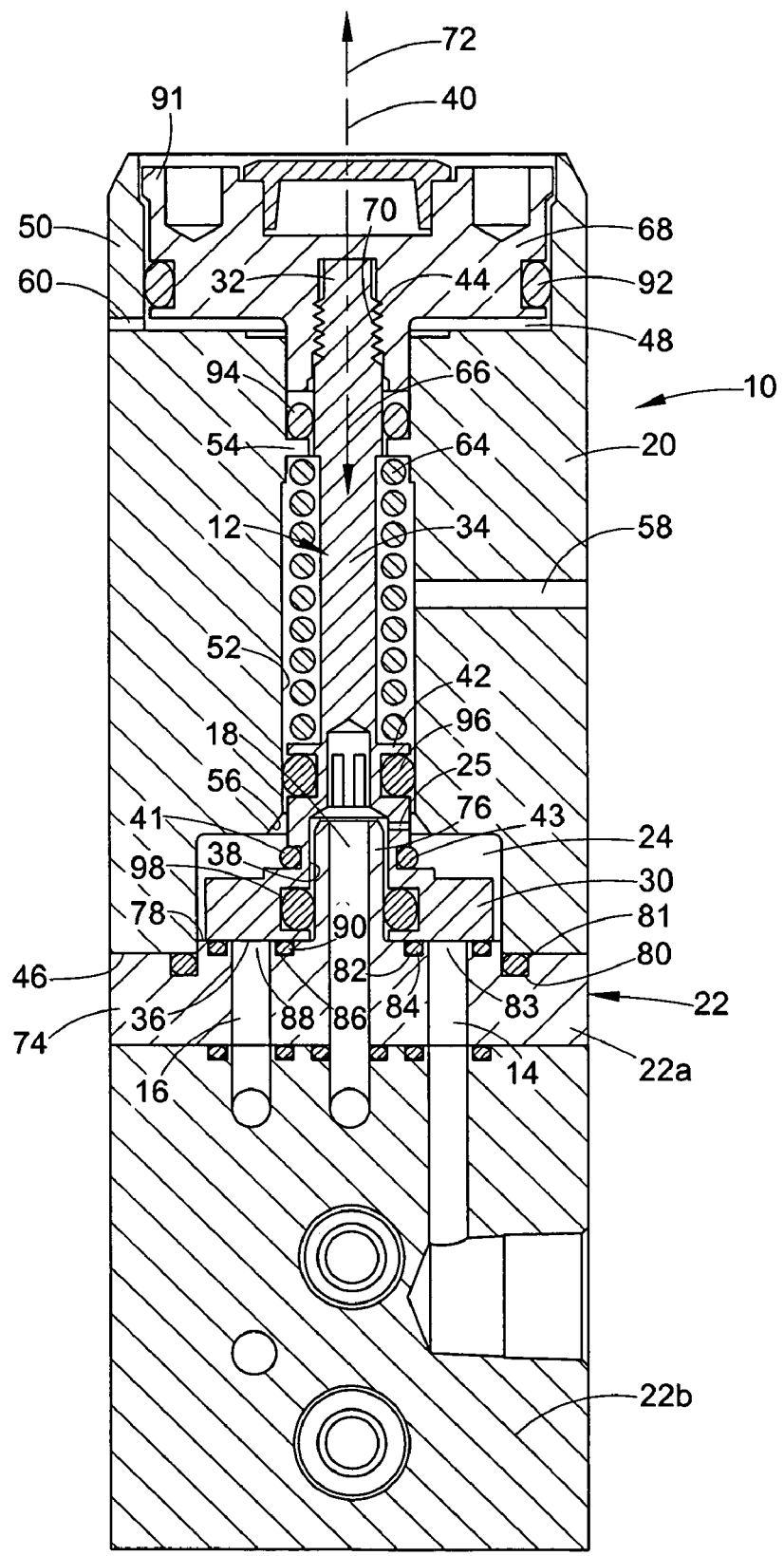
FIG. 2 is a sectional view taken along the plane indicated by lines 2-2 in FIG. 1.
Figure 3:
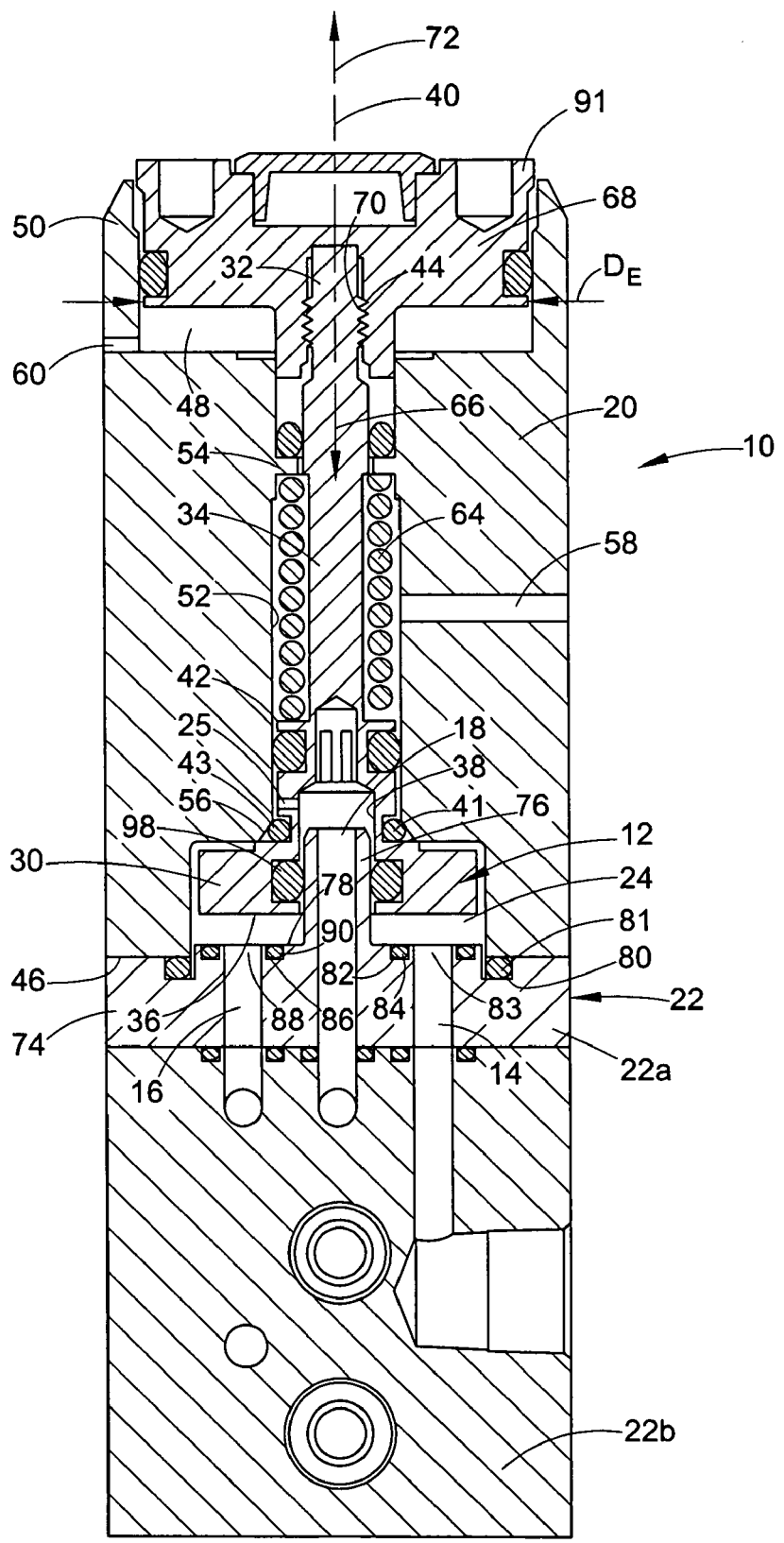
FIG. 3 is a sectional view taken along the plane indicated by lines 3-3 in FIG. 1.

FIGS. 1-9 illustrate examples of valve assemblies 10 with a valve member 12 that blocks an inlet passage 14, blocks an outlet passage 16 and opens a vent passage 18 when in a first state (See for example FIG. 2) and opens the inlet passage, opens the outlet passage and blocks the vent passage when in a second state (See for example FIG. 3). In the example illustrated by FIG. 1, the valves 10 are used in a stream selection system 11. The stream selection system controls the valves 10 to selectively supply a stream of the selected fluid to an analyzer. The stream selection system 11 is but one of many applications that the valves 10 disclosed herein can be used in.

In the examples illustrated by FIGS. 1-9, the valve assemblies 10 include a valve body 20, a valve member 12, and a passage defining member or assembly 22. The valve body 20, the valve member 12 and the passage defining member or assembly 22 can be made from a wide variety of different materials. Examples of suitable materials for the valve body, the valve member 12 and the passage defining member or assembly 22 include, but are not limited to stainless steel, carbon steel, alloy steel, monel, hastelloy, titanium, brass, aluminum, inconel, Monel, nickel, Teflon, PCTFE, PEEK, Vespel, and any other structural metal or plastics. It should be readily apparent that appropriate materials for the components of the valve assemblies may be selected based on the application of the valve assembly.

In this application, the term passage defining member encompasses a single component or a plurality of assembled components. The valve body 20 defines a valve chamber 24. The valve member 12 is disposed in the valve chamber 24, such that the valve member 12 is moveable between a first position (FIGS. 2, 4, 6, 8) and a second position (FIGS. 3, 5, 7, 9). In one embodiment, the passage defining member 22 defines at least a portion of the inlet passage 14, the outlet passage 16, and the vent passage 18. In other embodiments, the inlet passage, the outlet passage, and the vent passage may not be defined by a passage defining member 22. For example, the inlet passage, the outlet passage, and the vent passage may be defined by a valve body. In the illustrated examples, the passage defining member 22 is coupled to the valve body 20 such that the inlet passage 14, the outlet passage 16, and the vent passage 18 are in communication with the valve chamber 24. Flow between the inlet passage 14 and the valve chamber 24 is blocked, flow between the outlet passage 16 and the valve chamber is blocked, and flow between the vent passage 18 and the valve chamber is open when the valve member 12 is in the first position. Flow between the inlet passage 14 and the valve chamber 24 is open, flow between the outlet passage 16 and the valve chamber is open, and flow between the vent passage 18 and the valve chamber is blocked when the valve member is in the second position. In the example illustrated by FIGS. 2 and 3, the passage defining member 22 comprises a valve flange member 22a assembled with the valve body, and a manifold member 22b that routes fluid to and from the valve assembly 10. In the examples illustrated by FIGS. 4-9, the passage defining member 22 comprises a manifold member 22b secured directly to the valve body 20. The examples illustrated by FIGS. 1-9 illustrate a few of the wide variety of different forms or configurations the passage defining member 22 can take.

Figure 12:
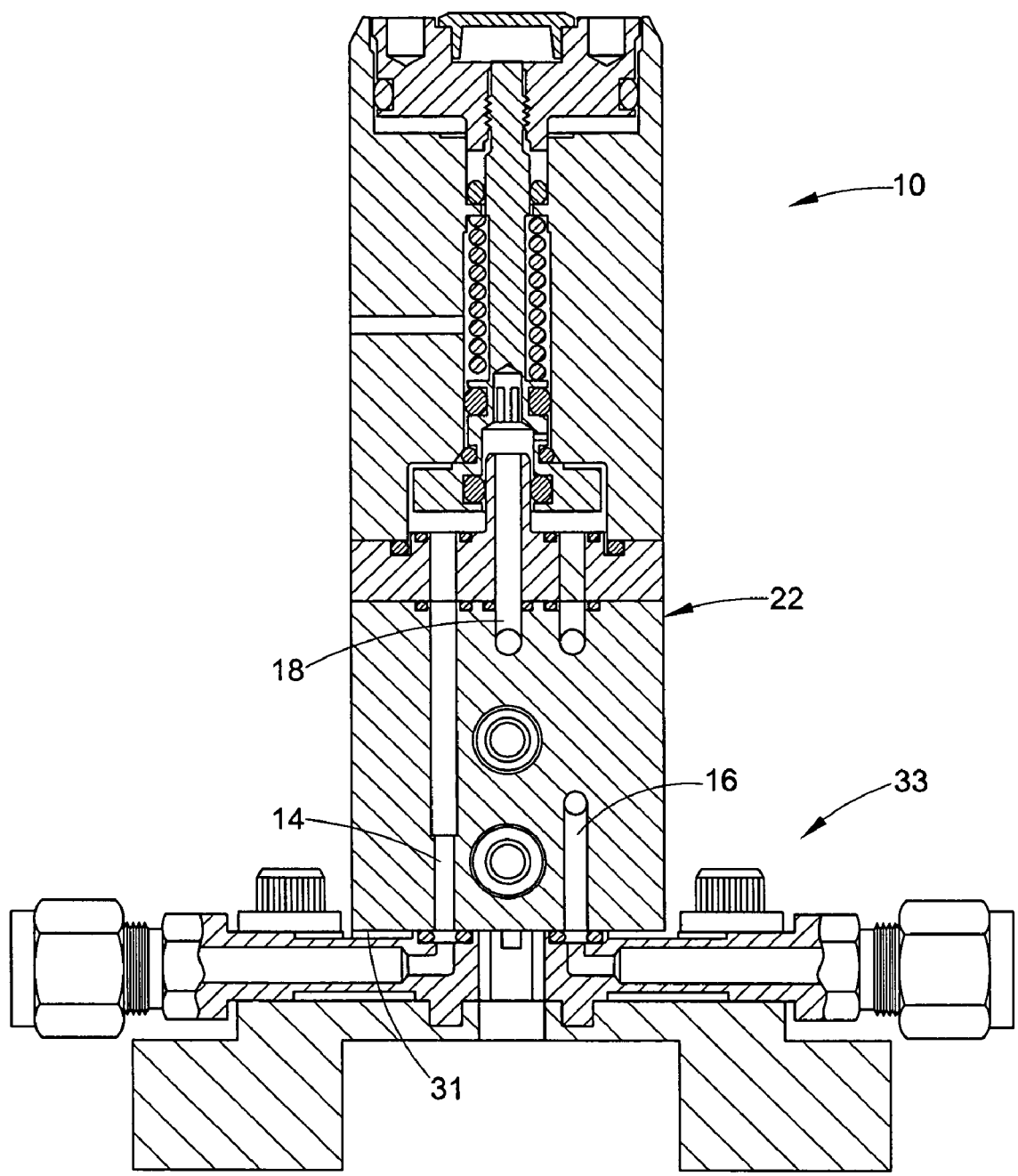
FIG. 12 is an illustration of a double block an bleed valve mounted to a modular surface mount manifold system.

Referring to FIG. 12, in one embodiment the inlet passage 14 and the outlet passage 16 exit through an end surface 31 of the passage defining member or assembly 22. Providing the inlet and outlet passages through the end surface 31 allows the valve assemblies to be mounted to a surface mount manifold system 33, including, but not limited to, the surface mount manifold system disclosed by United States Patent Application Publication No. 2004/0168732, published on Sep. 2, 2004, titled "Modular Surface Mount Fluid System," which is incorporated herein by reference in its entirety. In another embodiment, the purge passage 18 also extends through the end surface 31 to allow the purge port to be accessed through a surface mount manifold system. The footprint of the valve assembly may be configured to match the footprint required by any surface mount manifold system. For example, the size of the valve assembly 10 and the spacing and locations of the inlet and outlet passages 14, 16 may correspond to the footprint required by substrate and manifold components of Swagelok's Modular Platform Components (MPC) System.

The valve member 12 can take a wide variety of different forms. In the example illustrated by FIGS. 2 and 3, the valve member 12 includes a sealing end portion 30, a piston end portion 32, and an elongated shaft 34 extending between the sealing end portion and the piston end portion. In the example of FIGS. 2 and 3, the sealing end portion 30 is disk-shaped and extends radially outward of the shaft 34. The sealing end portion 30 may include a flat sealing face 36, and a vent port receiving recess 38. The illustrated vent port receiving recess 38 is a cylindrical shaped recess that extends inward from the sealing face 36 toward the shaft 34. In the illustrated embodiment, the vent port receiving recess 38 is axially aligned with a central axis 40 of the valve member 12. The sealing end portion 30 includes an annular vent seal recess 41. An annular vent sealing member 43 is disposed in the recess 41. A shoulder 42 is formed between the sealing end portion 30 and the shaft 34. In the embodiment illustrated by FIGS. 2 and 3, the piston end portion 32 includes external threads 44.

In the embodiment illustrated by FIGS. 2 and 3, the valve chamber 24 is a cylindrical chamber that is open at a first valve body end 46. A cylindrical piston chamber 48 is disposed in a second valve body end 50. A cylindrical spring chamber 52 is defined in the valve body 20 between the valve chamber 24 and the cylindrical piston chamber 48. An annular shoulder 54 separates the cylindrical recess 48 and the spring chamber 52. A frustoconical sealing surface 56 extends from the valve chamber 24 to the spring chamber 52. In the illustrated embodiment, the diameter of the sealing surface 56 decreases in a direction from the valve chamber 24 toward the spring chamber 52. In the illustrated embodiment, an optional vent 58 is defined in the valve body that extends from an external surface of the valve body to the spring chamber 52. A pneumatic control passage 60 is defined in the valve body. The pneumatic control passage may be defined in a wide variety of different ways. In the example illustrated by FIG. 1, the control passage extends from the piston chamber to the valve body end 46. Pneumatic passage 61 is in communication with the passage 60 and extends through the flange member 22a to the manifold member 22b. Pneumatic passage 63 is in communication with the passage 61 and extends to a pneumatic control port 65 defined in the manifold member 22b. In this configuration, the valve 10 is controlled by selectively applying fluid under pressure to the port 65 in the manifold member 22b. In the example illustrated by FIGS. 2 and 3, the pneumatic control passage 60 extends from the cylindrical piston chamber 48 to a pneumatic control port disposed in the side of the valve body. In the orientation illustrated by FIGS. 2 and 3, the pneumatic control passage is positioned at or near the bottom of the cylindrical piston chamber 48.

In the embodiment illustrated by FIGS. 2 and 3, the valve member 12 is disposed in the valve body, such that the sealing end portion 30 is disposed in the valve chamber 24, the piston end portion 32 is disposed in the piston chamber 48, and the elongated shaft 34 is disposed in the spring chamber 52. A spring 64 is constrained in the spring chamber 52 between the shoulder 42 and the shoulder 54. In the embodiment illustrated by FIGS. 2 and 3, the spring biases the sealing end portion 30 in the direction indicated by arrow 66. It should be readily apparent that the valve body and the spring could be configured to bias the valve member 12 in the opposite direction. For example, the spring 64 and the shoulder 42 could be repositioned such that the spring is constrained between the piston and the shoulder to bias the piston out of the valve body.

In the example of FIGS. 2 and 3, the actuating arrangement for selectively moving the valve member 12 between the first position and the second position is integrated into the valve assembly. It should also be readily apparent that a discrete actuating arrangement may be coupled to the valve to move the valve member between the first and second positions. In addition, any type of actuating arrangements could be used to move the valve member between the first and second positions. Examples include, but are not limited to pneumatic actuators, hydraulic actuators, and electric actuators.

In the embodiment illustrated by FIGS. 2 and 3, a piston 68 is disposed in the cylindrical recess 48. The piston can be made from a wide variety of different materials. Examples of acceptable materials for the piston include, but are not limited to stainless steel, carbon steel, alloy steel, monel, hastelloy, titanium, brass, aluminum, inconel, nickel, Teflon, PCTFE, PEEK, Vespel, and any other structural metal or plastics. The piston is connected to the valve member 12. In the example illustrated by FIGS. 2 and 3, the piston includes an internally threaded recess 70 that engages the external threads 44 to connect the piston to the valve member 12. In the example illustrated by FIGS. 2 and 3, the piston and the valve member 12 move in the direction indicated by arrow 72 against the biasing force of the spring 64 when fluid under pressure is applied to the piston chamber 48. In the example illustrated by FIGS. 2 and 3, the valve member 12 limits movement of the piston out of the valve assembly housing. As a result, a cap is not required to constrain axial movement of the piston. While the actuating arrangement illustrated by FIGS. 2 and 3 is shown and described with respect to a double block and bleed valve assembly, it should be readily apparent that the actuating arrangement could be used with a variety of different types of valve assemblies. For example, the type of arrangement illustrated by FIGS. 2 and 3 could be applied to any valve assembly, that is currently actuated by conventional actuators, including, but not limited to diaphragm valves.

Referring to FIGS. 2 and 3, the valve flange member 22a includes a base portion 74 and a cylindrical vent port protrusion 76 that extends from a an end wall of the base portion. In this example, the valve member is inserted directly into the valve chamber 24 through the first valve body end 46 before the flange member 22a is assembled to the valve body 20. In the illustrated examples, the valve flange member is separate from the valve body. The inlet passage 14 and the outlet passage 16 extend through the base portion 74. The vent passage 18 extends through the base portion 74 and the cylindrical vent protrusion 76. The base portion defines an end wall 78 of the valve chamber. The cylindrical vent protrusion 76 extends into the vent port receiving recess 38. The base portion includes an annular valve body seal recess 80. An o-ring 81 is disposed in the recess 80 to provide a seal between the valve body 20 and the flange member 22a. A seal recess 82 is disposed around an inlet passage opening 83 in the end wall 78 of the valve flange member 22a. An annular inlet seal member 84 is disposed in the seal recess 82. For example, the inlet seal member 84 may be permanently staked in the recess 82. A seal recess 86 is disposed around an outlet passage opening 88 in the end wall 78 of the valve flange member 22a. An annular outlet seal member 90 is disposed in the seal recess 86. For example, the outlet seal member 90 may be permanently staked in the seal recess 86 The inlet and outlet seal members are fixed with respect to the inlet passage and the outlet passage respectively. Defining the seal recesses 82, 86 in the valve flange member eliminates the need to define the seal recesses in the valve body. Machining the seal recesses in the valve body may require inserting a tool through the valve body to reach the surface where the seal recesses are to be defined. In the embodiment illustrated by FIGS. 2 and 3, when the inlet and outlet seal members become worn or damaged, the inlet and outlet seal members may be easily replaced by replacing the valve flange member 22a of the passage defining member 22 with a valve flange member that includes new inlet and outlet seal members. In another embodiment, the passage defining member may be a single piece that includes the seal members. The seal members may be replaced by replacing the single piece passage defining member.

In the example illustrated by FIGS. 2 and 3, o-rings are provided to provide seal between each of the parts of the valve 10. An o-ring 92 provides a seal between the piston and the valve body. O-rings 94, 96 provide a seals between the valve member 12 and the valve body. An o-ring 98 provides a seal between the valve member 12 and the flange member.

FIGS. 2 and 3 illustrate operation of the valve. The spring 64 biases the valve member 12 to the position illustrated in FIG. 2. In this position, the flat sealing face 36 engages both the inlet seal member 84 and the outlet seal member 90 to block both the inlet passage 14 and the outlet passage 16. In this position, any fluid in the valve chamber 24 is open to the vent passage 18. Any fluid that is in the valve chamber 24 can escape through the vent passage. In the example illustrated by FIGS. 1-3, a passage 25 is defined in the valve member 12 that allows fluid to flow from the valve chamber 24 to the vent passage 18 when the valve member is in the position shown in FIG. 3. When fluid under sufficient pressure to overcome the biasing force of the spring 64 is provided to the piston chamber 48, the piston and the valve member 12 move to the position shown in FIG. 3. The vent seal ring 43 engages the frustoconical surface 56 to limit axial movement of the piston out of the valve member housing. In this position, the flat sealing face 36 is spaced apart from both the inlet seal member 84 and the outlet seal member 90. Fluid may flow from the inlet passage 14, into the valve chamber 24, and out the outlet passage 16. In this position, the vent seal member 43 provides a seal between the frustoconical sealing surface 56 and the valve member 12 to block the flow of fluid from the valve chamber 24 to the vent passage 18. In the example illustrated by FIGS. 1-3, the seal between the conical sealing surface 56 and the valve member 12 prevents fluid flow to the passage 25 to thereby prevent fluid flow to the vent passage 18.

In the embodiment illustrated by FIGS. 2 and 3, axial movement of the valve member in the direction indicated by arrow 72 is limited by the valve body. Axial movement of the piston out of the piston recess is limited by the coaction of the valve member 12 and the valve body, since the piston and the valve member are coupled together. As a result, the valve member assembly 12 does not require a cap to limit axial movement of the piston. In the example illustrated by FIGS. 2 and 3, the piston 68 is flush with or slightly recessed into the valve body when the piston and the valve member are in the position illustrated by FIG. 2. In the example of FIGS. 2 and 3, the piston extends past the end of the valve body when the piston and the valve member are in the position illustrated by FIG. 3. The portion of the piston that extends past the end of the valve body provides a visual indication that the inlet and outlet ports are open. In one embodiment, the portion of the piston that extends past the end of the valve body has a finish that differs from a valve body finish to provide a visual indication of the position of the valve member and the piston. For example, the piston or a portion of the piston may be painted to provide an indication of the position of the valve member and the piston. In the embodiment illustrated by FIGS. 2 and 3, the portion of the piston that extends past the first end of the valve body includes a circumferential step 91 that limits exposure of the piston seal to foreign objects. In one embodiment, the circumferential step 91 includes a wiping ring that inhibits substantially all dirt and debris from reaching the piston seal. In the orientation illustrated by FIGS. 2 and 3, the actuation air passage 60 is located below the piston and air pressure above the piston does not need to be maintained. The height of the visual indicator does not need to be set, since the piston itself provides the visual indication.

In the embodiment illustrated by FIGS. 2 and 3, the valve member 12 may rotate with respect to the valve body 20 without effecting operation of the valve 10. When the valve member is in the position illustrated by FIG. 2, the sealing portion 30 will block the inlet passage and the outlet passage, regardless of the rotational position of the valve member 12 with respect to the valve body 20. When the valve member is in the position illustrated by FIG. 3, the vent seal member 43 will block the vent passage, regardless of the rotational position of the valve member 12 with respect to the valve body 20. As a result, the valve member will selectively open and block the valve passages regardless of a rotational position of the valve member relative to the valve chamber.

Figure 4:
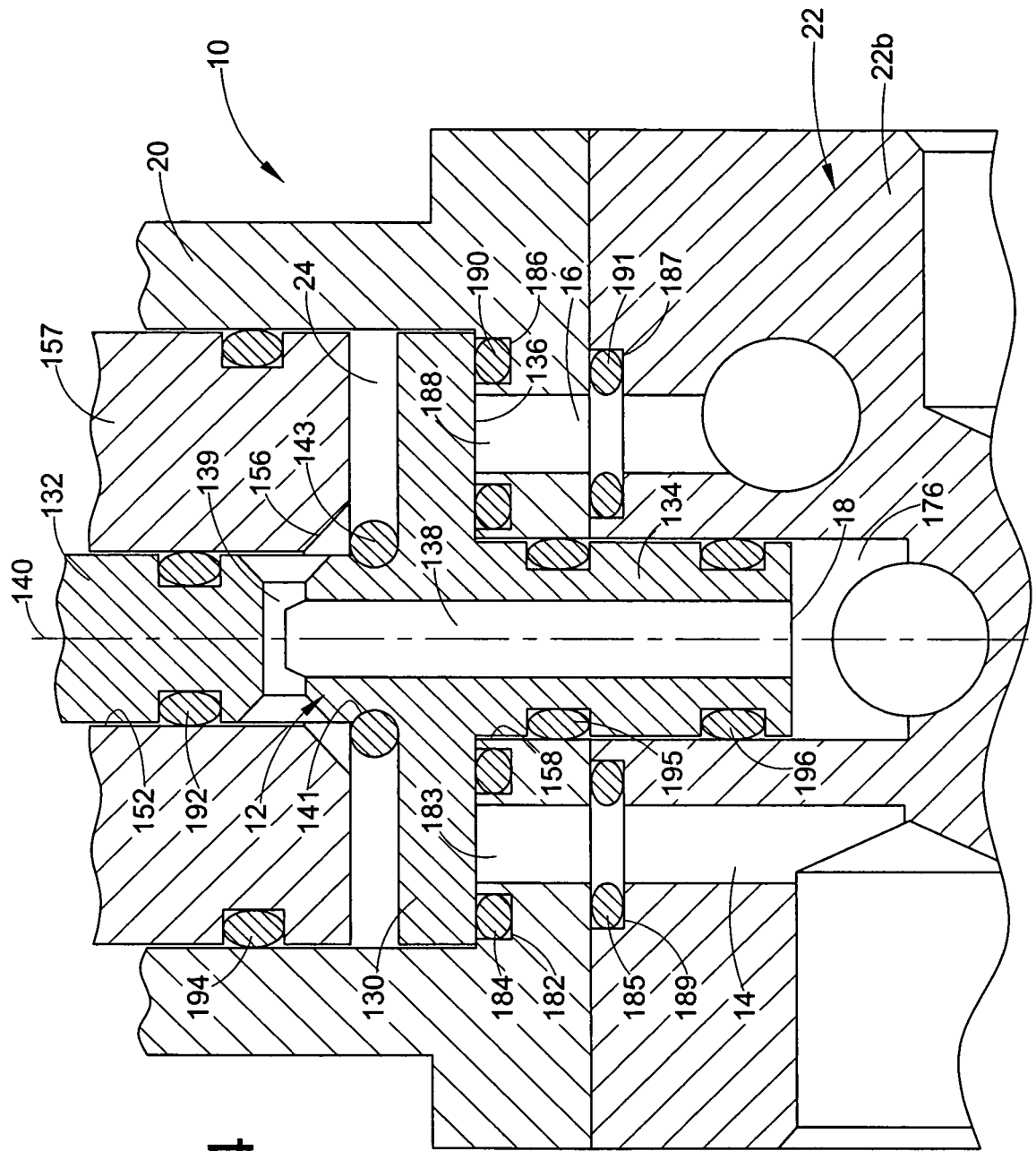
FIG. 4 is a sectional view of a valve member blocking an inlet passage, blocking an outlet passage, and allowing flow through a vent passage.
Figure 5:
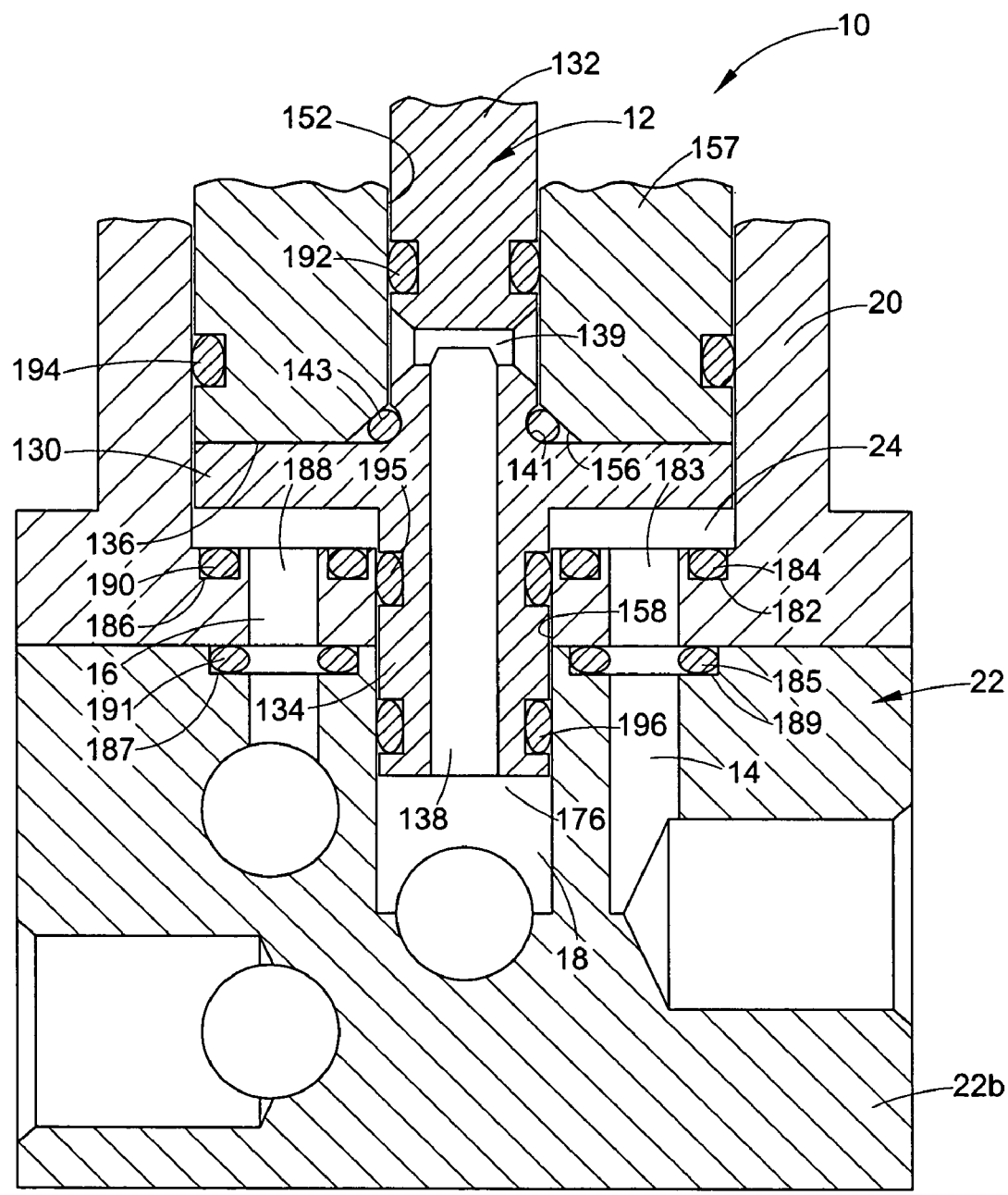
FIG. 5 is a sectional view of the valve illustrated by FIG. 4 with the valve member positioned to allow flow through the inlet passage, allow flow through the outlet passage, and block flow through the vent passage.
Figure 10A:
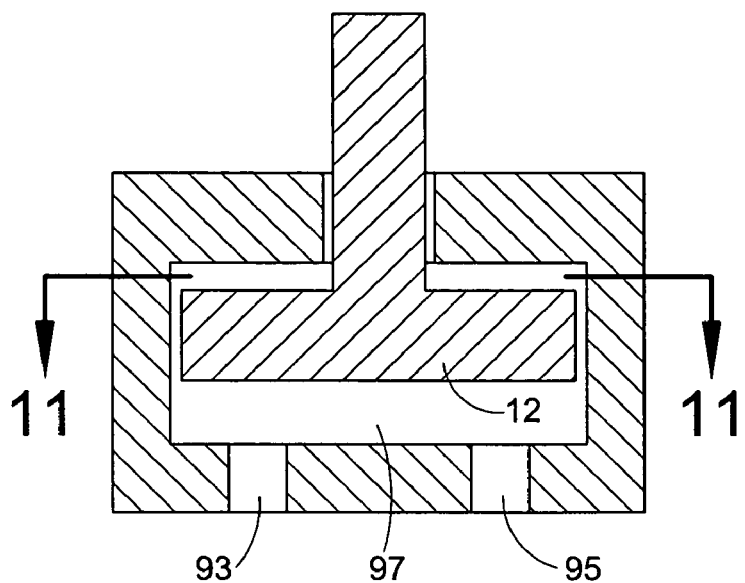
FIG. 10A is a schematic illustration of a valve with first and second co-planar ports in an open position.
Figure 10B:
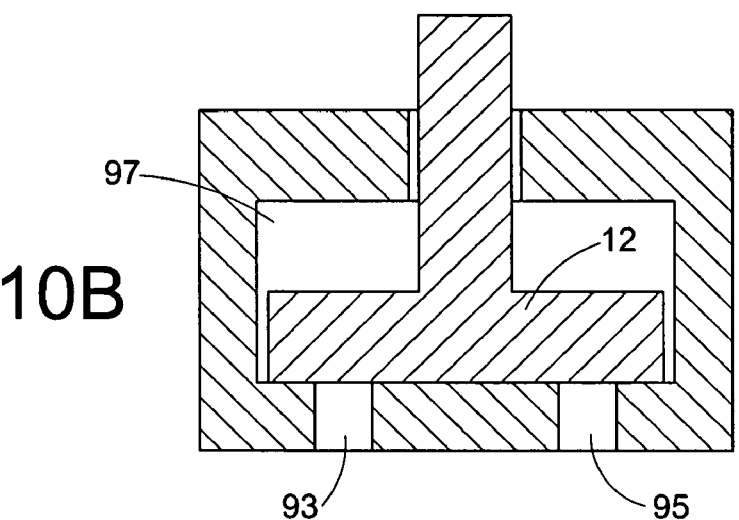
FIG. 10B illustrates the valve of FIG. 10A in a closed position.
Figure 11:
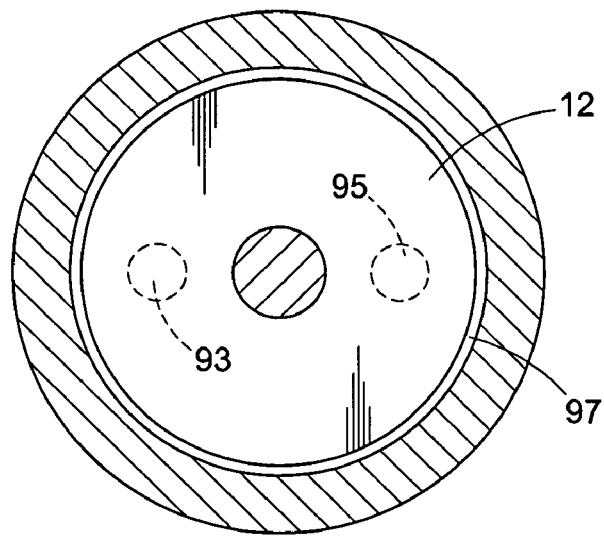
FIG. 11 is a sectional view taken along lines 11-11 in FIG. 10A.

Referring to FIGS. 10A, 10B, and 11, the concept of sealing co-planar inlet and outlet ports 93, 95 regardless of the rotational position of a valve member 12 may be applied to any type of valve. In FIG. 10A, the valve member is axially spaced apart from ports 93, 95 defined by a valve housing. In FIG. 10B, the valve member 12 is axially moved to a position in a valve chamber 97 where the valve member seals against both of the co-planar ports 93, 95. FIG. 11 illustrates that this sealing will occur, regardless of the rotational orientation of the valve member 12. The valve member is illustrated as a circular disk, but it may be any shape that covers the ports regardless of rotational orientation FIGS. 4 and 5 illustrate another example of a valve 10. An actuating arrangement for selectively moving the valve member 12 between the first position and the second position is not illustrated in FIGS. 4 and 5. Any suitable integral actuating arrangement may be incorporated into the valve 10, or any discrete actuating arrangement may be coupled to the valve to move the valve member between the first and second positions. Examples of suitable actuating arrangements include, but are not limited to pneumatic actuators, hydraulic actuators, and electric actuators.

In the embodiment illustrated by FIGS. 4 and 5, the valve member 12 includes a sealing portion 130, an actuation portion 132, and a venting portion 134. The sealing portion 130 is disk-shaped and extends radially outward of the actuation portion 132, and the venting portion 134. The illustrated sealing portion 130 includes a flat sealing face 136. The venting portion 134 is a cylindrical shaft that includes a longitudinal vent passage 138 and a transverse vent passage 139. In the illustrated embodiment, the venting portion 134 is axially aligned with a central axis 140 of the valve member 12. The venting portion 134 includes an annular vent seal recess 141. An annular vent sealing member 143 is disposed in the recess 141.

In the embodiment illustrated by FIGS. 4 and 5, the valve chamber 24 is a cylindrical chamber. A cylindrical passage 152 is defined in the valve body 20. A frustoconical sealing surface 156 extends from the valve chamber 24 to the chamber 152. In the illustrated embodiment, the diameter of the sealing surface 156 decreases from the valve chamber 24 to the chamber 152. In the embodiment illustrated by FIGS. 4 and 5, the cylindrical chamber 152 and the frustoconical sealing surface 156 is defined by a member 157 positioned in the valve body 20. A cylindrical vent opening 158 extends through the valve body to the valve chamber 24. The valve body includes a seal recess 182 that is disposed around an inlet passage opening 183. An annular inlet seal member 184 is disposed in the seal recess 182. The valve body includes a seal recess 186 around an outlet passage opening 188. An annular outlet seal member 190 is disposed in the seal recess 186. In this example, the inlet and outlet seal members are fixed with respect to the inlet passage and the outlet passage respectively. In another embodiment, the inlet and outlet seal members may be fixed to the sealing portion 130, instead of the valve body.

In the embodiment illustrated by FIGS. 4 and 5, the valve member 12 is disposed in the valve body, such that the sealing portion 130 is disposed in the valve chamber 24, the actuation portion 132 extends through the cylindrical passage 152, and the venting portion 134 extends through the cylindrical vent opening 158.

In the embodiment illustrated by FIGS. 4 and 5, the inlet passage 14 and the outlet passage 16 extend through both the manifold member 22*b* and the valve body 20. The manifold member includes a cylindrical vent chamber 176. The vent passage 18 extends from the vent chamber 176 out of the manifold member 22*b*. The cylindrical vent portion 134 extends into the cylindrical vent chamber 176. The manifold member includes an inlet seal recess 189. An annular inlet seal member 185 is disposed in the seal recess 189 to provide a seal between the valve body and the manifold member to inhibit leakage out of the inlet passage. The manifold member includes an outlet seal recess 187. An annular outlet seal member 191 is disposed in the seal recess 187 to provide a seal between the valve body and the manifold member to inhibit leakage out of the outlet passage.

In the example illustrated by FIGS. 4 and 5, o-rings provide a seal between each of the parts of the valve 10. An o-ring 192 provides a seal between the valve member 12 and the member 157. An o-ring 194 provides a seal between the valve member valve body 20 and the member 157. An o-ring 195 provides a seal between the valve member 12 and the valve body 20. An o-ring 196 provides a seal between the valve member 12 and the manifold member 22*b*.

FIGS. 4 and 5 illustrate operation of the valve. In the position illustrated by FIG. 4, the flat sealing face 136 engages both the inlet seal member 184 and the outlet seal member 190 to block both the inlet passage 14 and the outlet passage 16. In this position, the valve chamber 24 is open to the vent passage 18. Any fluid that is in the valve chamber 24 can escape through the passage 139 and the vent passage 138. In the position illustrated by FIG. 5, the flat sealing face 136 is spaced apart from both the inlet seal member 184 and the outlet seal member 190. Fluid may flow from the inlet passage 14, into the valve chamber 24, and out the outlet passage 16. In this position, the vent seal member 143 provides a seal between the frustoconical sealing surface 156 and the valve member 12 to block the flow of fluid from the valve chamber 24 to the passage 139 and the vent passage 18.

In the embodiment illustrated by FIGS. 4 and 5, the valve member 12 may rotate with respect to the valve body 20 without effecting operation of the valve 10. When the valve member is in the position illustrated by FIG. 4, the sealing portion 30 will block the inlet passage and the outlet passage, regardless of the rotational position of the valve member 12 with respect to the valve body 20. When the valve member is in the position illustrated by FIG. 5, the vent seal member 143 will block the vent passage, regardless of the rotational position of the valve member 12 with respect to the valve body 20. As a result, the valve member will selectively open and block the valve passages regardless of a rotational position of the valve member relative to the valve chamber.

Figure 6:
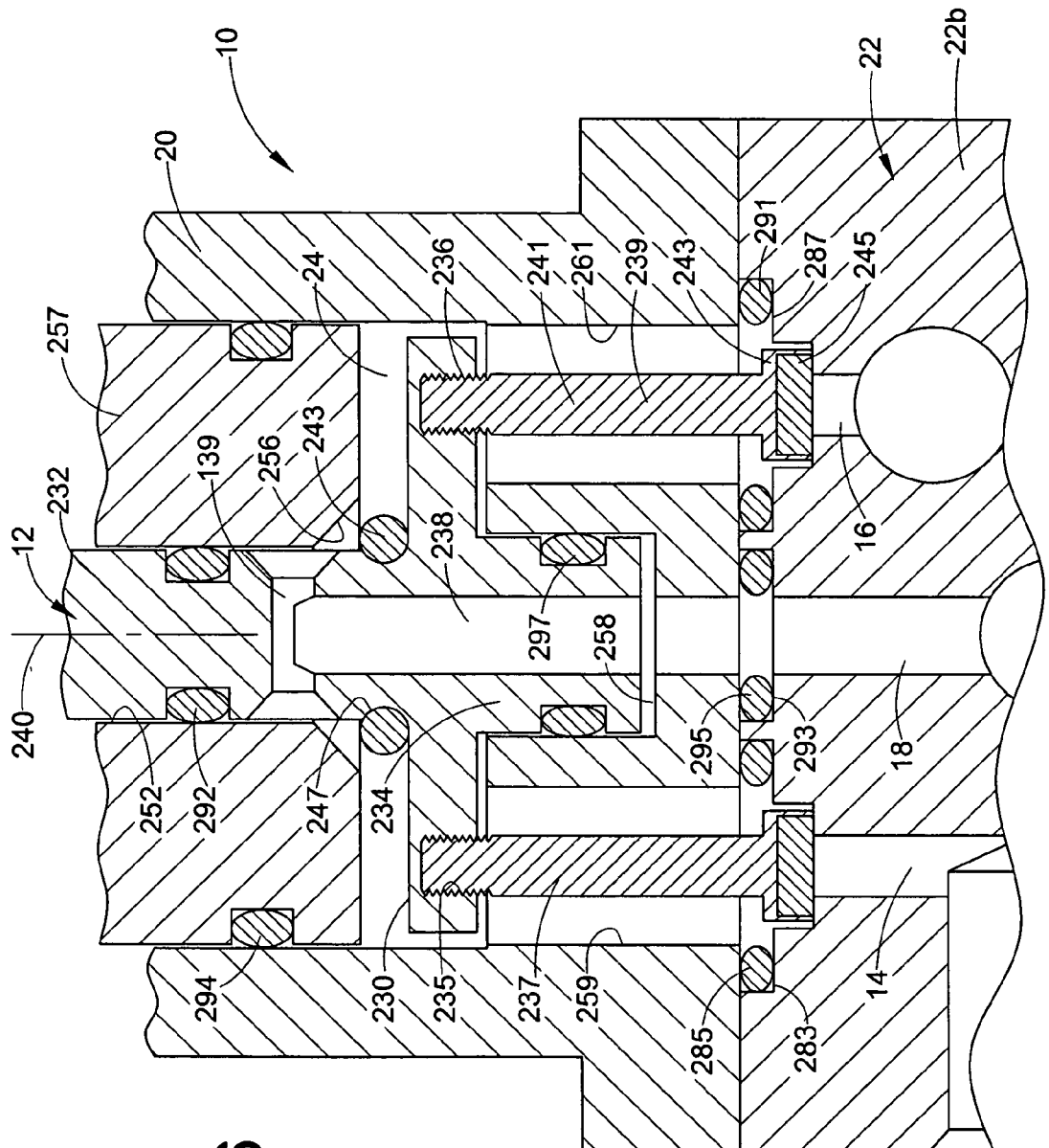
FIG. 6 is a sectional view of a valve blocking an inlet passage, blocking an outlet passage, and allowing flow through a vent passage.
Figure 7:
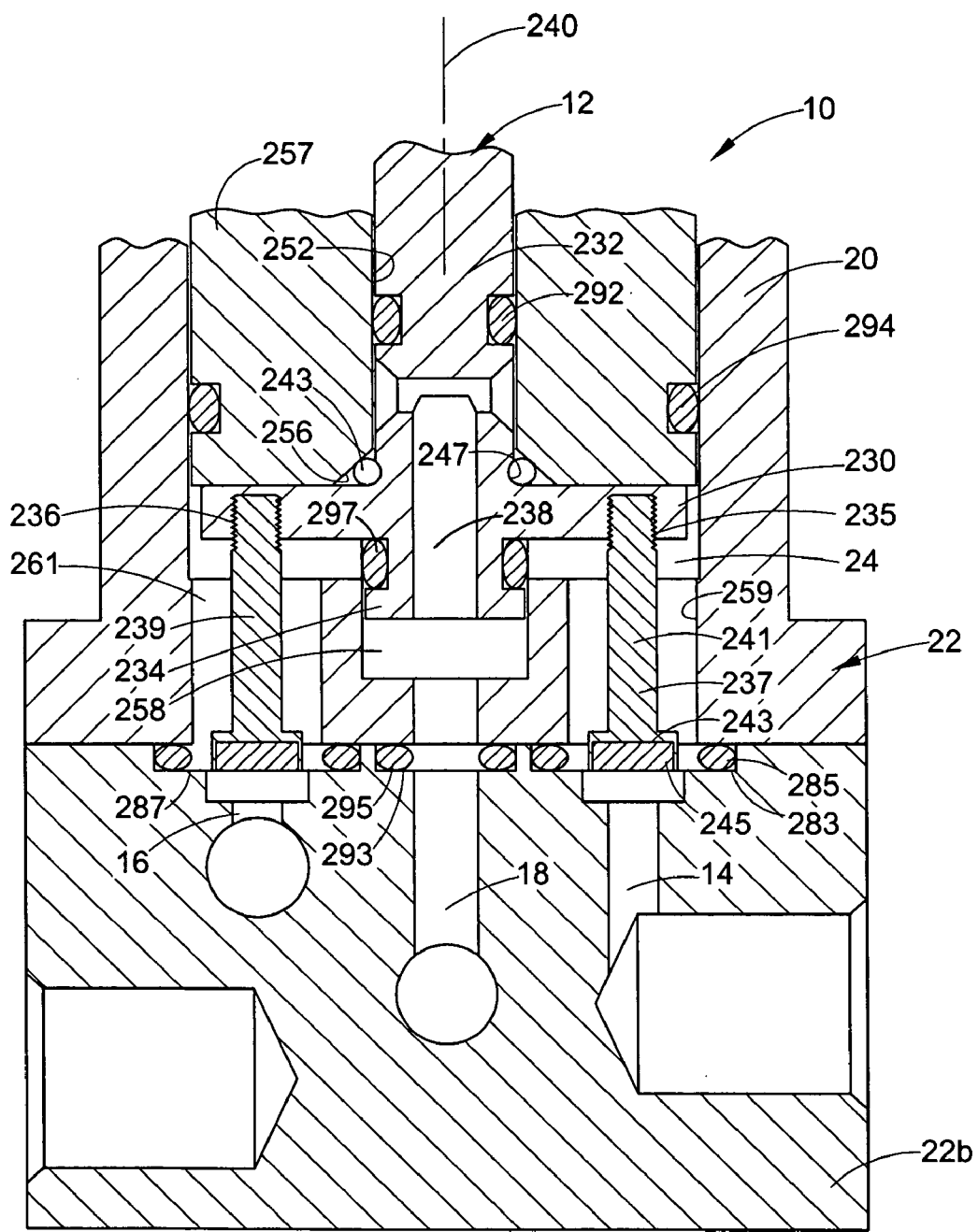
FIG. 7 is a sectional view of the valve illustrated by FIG. 6 allowing flow through the inlet passage, allowing flow through the outlet passage, and blocking flow through the vent passage.

FIGS. 6 and 7 illustrate another example of a valve 10. A actuating arrangement for selectively moving the valve member 12 between the first position and the second position is not illustrated in FIGS. 6 and 7. Any suitable integral actuating arrangement may be incorporated into the valve 10, or any discrete actuating arrangement may be coupled to the valve to move the valve member between the first and second positions.

In the embodiment illustrated by FIGS. 6 and 7, the valve member 12 includes a seal member carrying portion 230, an actuation portion 232, and a venting portion 234. In the illustrated embodiment, the seal member carrying portion 230 is disk-shaped and extends radially outward of the actuation portion 232, and the venting portion 234. The seal member carrying portion 230 includes internally threaded recesses 235, 236. Elongated inlet and outlet sealing structures 237, 239 extend from the seal member carrying portion 230. In the illustrated embodiment, the sealing structures 237, 239 each include a shaft portion 241, a seal carrying portion 243 disposed at an end of the shaft portion, and a seal member 245 carried by the seal carrying portion. In the example illustrated by FIGS. 6 and 7, each shaft portion 241 includes a threaded end that engages the threaded recesses 235, 236 to connect the elongated sealing structure to the valve member. The venting portion 234 is a cylindrical shaft that includes a vent passage 238. In the illustrated embodiment, the venting portion 234 is axially aligned with a central axis 240 of the valve member 12. The venting portion 234 includes an annular vent seal recess 247. An annular vent sealing member 243 is disposed in the recess 247.

In the embodiment illustrated by FIGS. 6 and 7, the valve chamber 24 is a cylindrical chamber. A cylindrical passage 252 is defined in the valve body 20. A frustoconical sealing surface 256 extends from the valve chamber 24 to the passage 252. In the illustrated embodiment, the diameter of the sealing surface 256 decreases from the valve chamber 24 to the chamber 252. In the embodiment illustrated by FIGS. 6 and 7, the cylindrical passage 252 and the frustoconical sealing surface 256 are defined by a member 257 positioned in the valve body 20. A cylindrical vent chamber 258 is defined in the valve body. A cylindrical inlet seal member passage 259 and a cylindrical outlet seal member passage 261 are defined through the valve body 20 and are in communication with the valve chamber 24.

In the embodiment illustrated by FIGS. 6 and 7, the valve member 12 is disposed in the valve body, such that the elongated inlet and outlet sealing structures 237, 239 are disposed in the cylindrical passages 259, 261 respectively, the actuation portion 232 extends into the cylindrical chamber 252, and the venting portion 234 extends into the cylindrical vent chamber 258.

In the embodiment illustrated by FIGS. 6 and 7, the manifold member includes an inlet seal recess 283. An annular inlet seal member 285 is disposed in the seal recess 283 to provide a seal between the valve body and the manifold member to inhibit leakage out of the inlet passage. The manifold member includes an outlet seal recess 287. An annular outlet seal member 291 is disposed in the seal recess 287 to provide a seal between the valve body and the manifold member to inhibit leakage out of the outlet passage. The manifold member includes a vent seal recess 293. An annular vent seal member 295 is disposed in the seal recess 293 to provide a seal between the valve body and the manifold member to inhibit leakage out of the vent passage.

In the example illustrated by FIGS. 6 and 7, o-rings are provided to provide seals between each of the parts of the valve 10. An o-ring 292 provides a seal between the valve member 12 and the member 257. An o-ring 294 provides a seal between the valve member valve body 20 and the member 257. An o-ring 297 provides a seal between the valve member 12 and the valve body 20.

FIGS. 6 and 7 illustrate operation of the valve. In the position illustrated by FIG. 6, the elongated sealing structure 237 engages the manifold member to block the inlet passage 14, the elongated sealing structure 239 engages the manifold member to block the outlet passage 16. In this position, any fluid in the valve chamber 24 is open to the vent passage 18. Any fluid that is in the valve chamber 24 can escape through the vent passage 238. In the position illustrated by FIG. 7, the sealing structures 237, 239 are spaced apart from an inlet opening and an outlet opening respectively. Fluid may flow from the inlet passage 14, into the valve chamber 24, and out the outlet passage 16. In this position, the vent seal member 243 provides a seal between the frustoconical sealing surface 256 and the valve member 12 to block the flow of fluid from the valve chamber 24 to the vent passage 18.

Figure 8:
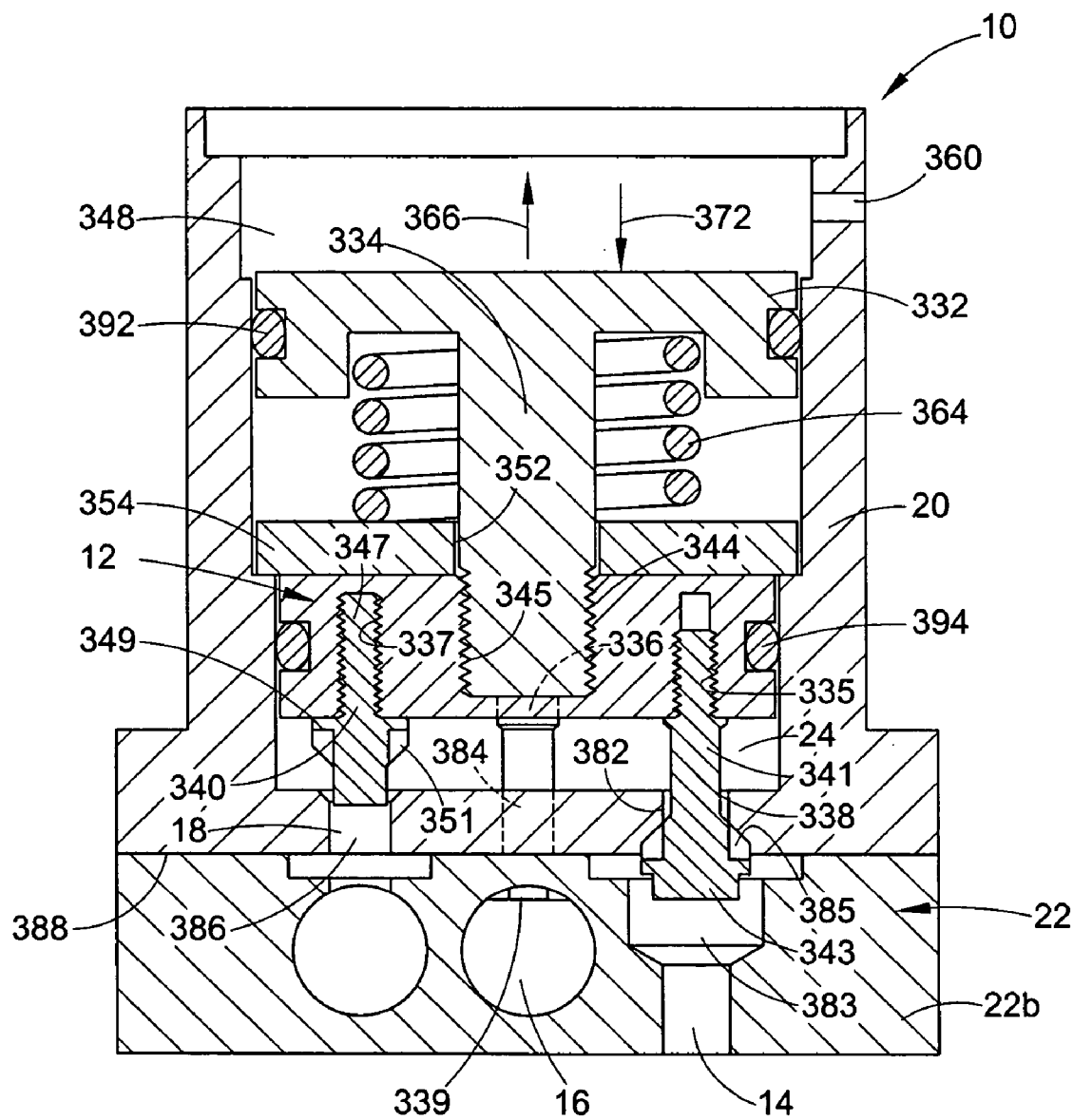
FIG. 8 is a sectional view of a valve blocking an inlet passage, blocking an outlet passage, and allowing flow through a vent passage.
Figure 9:
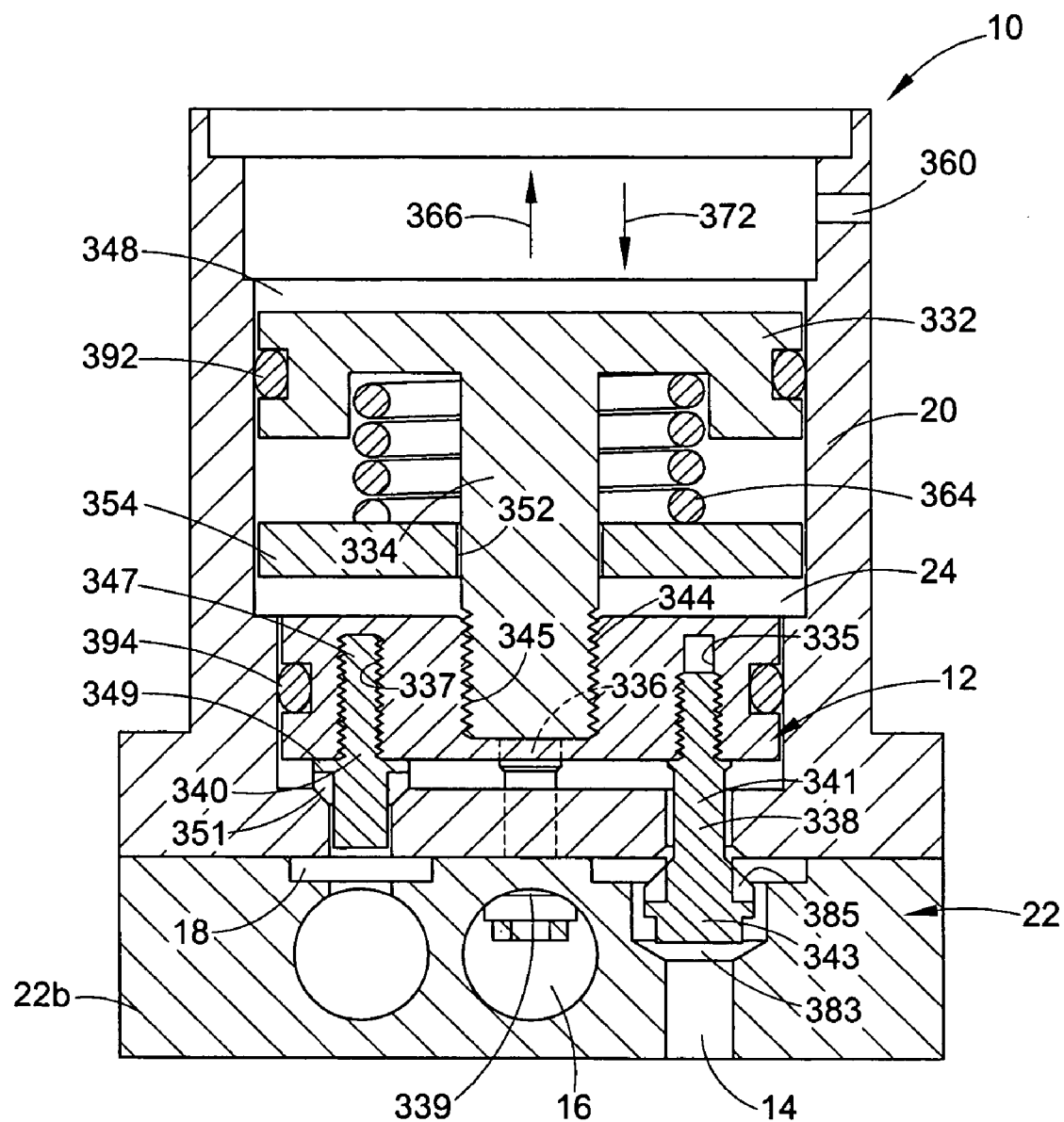
FIG. 9 is a sectional view of the valve illustrated by FIG. 8 allowing flow through the inlet passage, allowing flow through the outlet passage, and blocking flow through the vent passage.

FIGS. 8 and 9 illustrate another example of a valve 10. In the embodiment illustrated by FIGS. 8 and 9, the valve member 12 is assembled to piston 332, by an elongated shaft 334. In the embodiment illustrated by FIGS. 8 and 9, the elongated shaft 334 includes external threads 344 and the valve member 12 includes internal threads 345. The external threads 344 engage the internal threads 345 to connect the elongated shaft 334 to the valve member 12. The valve member 12 includes internally threaded recesses 335, 336, 337. Elongated inlet, outlet, and vent sealing structures 338, 339, 340 extend from the valve member 12. In the illustrated embodiment, the inlet and outlet sealing structures 338, 339 each include a shaft portion 341, a seal carrying portion 343, and a seal member 385 carried by the seal carrying portion. The seal carrying portion 343 is configured to orient the seal member toward the valve member 12. In the illustrated embodiment, vent sealing structure 340 includes a shaft portion 347, a seal carrying portion 349, and a seal member 351 carried by the seal carrying portion. The shaft 347 of the vent sealing structure is shorter than the shafts 341 of the inlet and outlet sealing structures in the example. The seal carrying portion 349 is configured to orient the seal member away from the valve member 12. In the example illustrated by FIGS. 8 and 9, each shaft portion 341, 347 includes a threaded end that engages the threaded recesses 335, 336, 337 to connect the elongated sealing structure to the valve member.

In the embodiment illustrated by FIGS. 8 and 9, the valve chamber 24 is a cylindrical chamber. An inlet passage 382, an outlet passage 384, and a vent passage 386 extend through an end wall 388 of the valve body and form a portion of the inlet 14, the outlet 16, and the vent 18. A cylindrical piston chamber 348 is disposed in the valve body. A dividing wall 354 separates the valve chamber 24 and the piston chamber 348. A cylindrical valve member passage 352 extends through the dividing wall. A pneumatic control passage 360 is defined in the valve body.

In the embodiment illustrated by FIGS. 8 and 9, the valve member 12 is disposed in the in the valve chamber 24, the piston 332 is disposed in the piston chamber 348, and the elongated shaft 334 extends through the passage 352. A spring 364 is constrained in the piston chamber 352 between the piston 332 and the dividing wall 354. In the embodiment illustrated by FIGS. 8 and 9, the spring biases the valve member in the direction indicated by arrow 366. The piston moves in the direction indicated by arrow 372 against the biasing force of the spring 364 when fluid under pressure is applied to the piston chamber 348.

In the example of FIGS. 8 and 9, an actuating arrangement for selectively moving the valve member 12 between the first position and the second position is integrated into the valve. It should also be readily apparent that a discrete actuating arrangement may be coupled to the valve to move the valve member between the first and second positions. In addition, any type of actuating arrangement could be used to move the valve member between the first and second positions.

In the embodiment illustrated by FIGS. 8 and 9, the inlet passage 14, the outlet passage 16, and the vent passage 18 extend through both the manifold member 22 and the valve body 20. The inlet passage in the manifold member includes a chamber 383 that accommodates the inlet seal carrying portion and the inlet seal member. The outlet passage in the manifold member includes a chamber (hidden, but similar to chamber 383) that accommodates the outlet seal carrying portion and the outlet seal member.

In the example illustrated by FIGS. 8 and 9, o-rings (not shown) may provide seals between each of the parts of the valve 10. The o-rings and seal members disclosed in the various examples described by the present application may be made from a wide variety of different materials. Examples of materials that may be used include, but are not limited to, PCTFE, Teflon, PTFE, Modified PTFE, Vespel, PEEK, Viton, Fluorocarbon FKM, Kalrez, Simriz, Perfluoroelastomer, Buna, UHMWPE, Ethylene Propylene, Silicone, Alfas, Nylon, Torlon, stainless steel, carbon steel, alloy steel, monel, hastelloy, titanium, brass, aluminum, inconel, nickel, and any other structural metal or plastic.

FIGS. 8 and 9 illustrate operation of the valve. In the position illustrated by FIG. 8, the elongated inlet sealing structure 338 engages the valve body end wall outer surface to block the inlet passage 14, the elongated sealing structure 339 engages the valve body end wall outer surface to block the outlet passage 16. The elongated vent sealing structure 340 is spaced apart from the valve body end wall (above the valve body end wall in the orientation illustrated by FIGS. 8 and 9). Any fluid that is in the valve chamber 24 can escape through the vent passage. In the position illustrated by FIG. 9, the sealing structures 338, 339 are spaced apart from the valve body. Fluid may flow from the inlet passage 14, into the valve chamber 24, and out the outlet passage 16. In this position, the vent sealing structure 340 engages the valve body end wall inner surface to block the to the vent passage 18.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

The invention claimed is:

1. A valve assembly, comprising:
   a valve chamber;
   an inlet passage in communication with the valve chamber;
   an outlet passage in communication with the valve chamber;
   a vent passage in communication with the valve chamber;
   a valve member disposed in the valve chamber, the valve member being axially moveable between a first position and a second position;
   wherein flow between the inlet passage and the valve chamber is blocked, flow between the outlet passage and the valve chamber is blocked, and flow between the vent passage and the valve chamber is open when the valve member is in the first position regardless of a rotational orientation of the valve member in the valve chamber;
   wherein flow between the inlet passage and the valve chamber is open, flow between the outlet passage and the valve chamber is open, and flow between the vent passage and the valve chamber is blocked when the valve member is in the second position regardless of the rotational orientation of the valve member in the valve chamber.

2. The valve of claim 1 wherein the valve member comprises an annular disk.

3. The valve of claim 1 wherein an axis of the vent passage is aligned with an axis of the valve member.

4. The valve of claim 1 wherein an axis of the vent passage is aligned with an axis of the valve chamber.

5. A method of controlling fluid flow comprising:
   providing fluid to an inlet passage that is in communication with a valve chamber;
   positioning a valve member in a first axial position in the valve chamber where fluid flow between the inlet passage and the valve chamber is blocked, fluid flow between the outlet passage and the valve chamber is blocked, and fluid flow between the vent passage and the valve chamber is open regardless of a rotational orientation of the valve member in the valve chamber;
   positioning the valve member in a second axial position in the valve chamber where fluid flow between the inlet passage and the valve chamber is open, fluid flow between the outlet passage and the valve chamber is open, and fluid flow between the vent passage and the valve chamber is blocked regardless of the rotational orientation of the valve member in the valve chamber.

6. A valve assembly, comprising:
   a valve body including a valve chamber;
   a passage defining member defining an inlet passage, an outlet passage, and a vent passage, the passage defining member being assembled with the valve body to close the valve chamber;
   a valve member assembled in the valve chamber by inserting the valve member into the valve chamber from an end of the valve body that the passage defining is to be assembled to prior to assembly of the passage defining member with the valve body;
   wherein the valve member blocks fluid flow between the inlet passage and the valve chamber, blocks fluid flow between the outlet passage and the valve chamber, and allows fluid flow between the vent passage and the and the valve chamber when the valve member is in a first position in the valve chamber, and wherein the valve member allows fluid flow between the inlet passage and the valve chamber, allows fluid flow between the outlet passage and the valve chamber, and blocks fluid flow between the vent passage and the and the valve chamber when the valve member is in a second position in the valve chamber.

7. A valve assembly, comprising:
a valve body defining a valve chamber;
a valve member disposed in the valve chamber, the valve member being moveable between a first position and a second position;
a passage defining member that defines an inlet passage, an outlet passage, and a vent passage,
an inlet seal member assembled with the passage defining member such that the inlet seal surrounds the inlet passage;
an outlet seal member assembled with the passage defining member such that the outlet seal surrounds the outlet passage, wherein the valve member contacts the inlet seal member and the outlet seal member to block flow between the inlet passage and the valve chamber and block flow between the outlet passage and the valve chamber when the valve member is in the first position, and wherein the valve member is spaced apart from the inlet seal member and the outlet seal member to allow flow between the inlet passage and the outlet passage when the valve member is in the second position.

8. The valve of claim 7 wherein the passage defining member defines a wall of the valve chamber.

9. The valve of claim 7 wherein the passage defining member and the valve body are discrete components.

10. The valve of claim 7 wherein the passage defining member includes a vent port boss that extends from a face of the passage defining member.

11. A valve assembly, comprising:
a valve body defining a valve chamber;
a valve member disposed in the valve chamber, the valve member being moveable between a first position and a second position;
a passage defining member that defines an inlet passage, an outlet passage, and a vent passage, the passage defining member is coupled to the valve body to close the valve chamber such that the inlet passage, the outlet passage, and the vent passage are in communication with the valve chamber;
wherein flow between the inlet passage and the valve chamber is blocked, flow between the outlet passage and the valve chamber is blocked, and flow between the vent passage and the valve chamber is open when the valve member is in the first position;
wherein flow, between the inlet passage and the valve chamber is open, flow between the outlet passage and the valve chamber is open, and flow between the vent passage and the valve chamber is blocked when the valve member is in the second position.

12. The valve of claim 11 wherein the passage defining member defines a wall of the valve chamber.

13. The valve of claim 11 further comprising an inlet seal that is fixed with respect to the inlet passage and an outlet seal that is fixed with respect to the outlet passage, wherein the valve member engages the inlet seal and the outlet seal when the valve member is in the first position.

14. The valve of claim 11 wherein the valve member comprises an annular disk.

15. The valve of claim 11 wherein the valve member selectively opens and blocks the valve passages regardless of a rotational position of the valve member relative to the valve chamber.

16. The valve of claim 11 further comprising an elongated inlet sealing structure extending from the valve member and an elongated outlet sealing structure extending from the valve member, wherein the elongated inlet sealing structure engages the passage defining member to seal the inlet passage and the elongated outlet sealing structure engages the passage defining member to seal the outlet passage when the valve member is in the first position.

17. The valve of claim 11 further comprising a vent sealing member disposed around a valve member shaft, wherein the vent sealing member provides a seal between the valve member and the valve body when the valve member is in the second position to block flow between the valve chamber and the vent passage when the valve member is in the second position.

18. The valve of claim 11 further comprising an elongated inlet sealing structure extending from the valve member and an elongated outlet sealing structure extending from the valve member, wherein the elongated inlet sealing structure engages a valve body outer surface to seal the inlet passage and the elongated outlet sealing structure engages the valve body outer surface to seal the outlet passage when the valve member is in the first position.

19. The valve of claim 11 further comprising an elongated vent sealing structure extending from the valve member, wherein the elongated vent sealing structure engages a valve body inner surface to seal the vent passage when the valve member is in the second position.

20. The valve of claim 11 further comprising an elongated inlet sealing structure extending from the valve member, an elongated outlet sealing structure extending from the valve member, and an elongated vent sealing structure extending from the valve member, wherein the elongated inlet sealing structure engages a valve body outer surface to seal the inlet passage and the elongated outlet sealing structure engages the valve body outer surface to seal the outlet passage when the valve member is in the first position, and the elongated vent sealing structure engages a valve body inner surface to seal the vent passage when the valve member is in the second position.

* * * * *

UNITED STATES PATENT AND TRADEMARK OFFICE
CERTIFICATE OF CORRECTION

| | | |
|---|---|---|
| PATENT NO. | : 7,610,928 B2 | Page 1 of 1 |
| APPLICATION NO. | : 11/359062 | |
| DATED | : November 3, 2009 | |
| INVENTOR(S) | : Feldman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 868 days.

Signed and Sealed this

Twelfth Day of October, 2010

David J. Kappos
*Director of the United States Patent and Trademark Office*